United States Patent [19]

Lichtenberg et al.

[11] Patent Number: 4,854,185
[45] Date of Patent: Aug. 8, 1989

[54] MANUALLY OPERATED AND LOCKED CONDUIT LENGTH ADJUSTER SYSTEM

[75] Inventors: Norman B. Lichtenberg, Troy, Mich.; Harold P. Sponseller, Maumee, Ohio; Jeffrey E. Totten, Trenton, Mich.

[73] Assignee: Babcock Industries Inc., Fairfield, Conn.

[21] Appl. No.: 258,630

[22] Filed: Oct. 17, 1988

[51] Int. Cl.[4] ............................................. F16C 1/10
[52] U.S. Cl. ................................. 74/501.5 R; 74/502; 74/502.4; 403/330; 132/111 A; 188/196 B
[58] Field of Search ............ 74/500.5, 501.5 R, 501.6, 74/502, 503, 502.4–502.6, 470, 489; 403/330 X; 188/196 B, 196 R, 196 M, 196 P; 192/111 A, 70.25, 30 W; 24/643, 647, 585, 133

[56] References Cited

U.S. PATENT DOCUMENTS

| | | | |
|---|---|---|---|
| 2,823,379 | 2/1958 | Novak | 403/330 X |
| 4,456,101 | 6/1984 | Yamamoto et al. | 192/111 A |
| 4,598,809 | 7/1986 | Glover et al. | 192/111 A |
| 4,669,330 | 6/1987 | Stocker | 74/502.4 X |
| 4,694,706 | 9/1987 | Lichtenberg et al. | 74/501.5 R |
| 4,753,123 | 6/1988 | Stormont | 74/501.5 R |
| 4,768,905 | 9/1988 | Reynard | 403/330 X |
| 4,787,263 | 11/1988 | Jaksic | 74/502.4 X |
| 4,793,206 | 12/1988 | Suzuki | 192/111 A X |
| 4,798,098 | 1/1989 | Keller et al. | 403/330 X |

FOREIGN PATENT DOCUMENTS

| | | | |
|---|---|---|---|
| 0183338 | 6/1986 | European Pat. Off. | 74/501.5 R |
| 2600611 | 7/1976 | Fed. Rep. of Germany | 403/330 |
| 2590338 | 5/1987 | France | 74/501.5 R |

Primary Examiner—Vinh Luong
Attorney, Agent, or Firm—Barnes, Kisselle, Raisch, Choate, Whittemore & Hulbert

[57] ABSTRACT

A manually operated and locked conduit length adjuster system comprising a cable adapted to be connected at one end to an actuator and at the other end to a device to be actuated, a first length of conduit adapted to be attached at one end to a fixed point and at the other end to a manually locked conduit length adjuster. The manually locked conduit length adjuster includes a plastic body adapted to be attached to the first length of conduit and having an opening through which a plastic slider extends. The slider includes annular teeth and the plastic body includes a locking member integrally hinged to the plastic body and adapted to be moved into position to cause teeth thereon to engage the teeth on the slider. The locking member has other portions thereof which engage the body for locking the locking member in position.

40 Claims, 3 Drawing Sheets

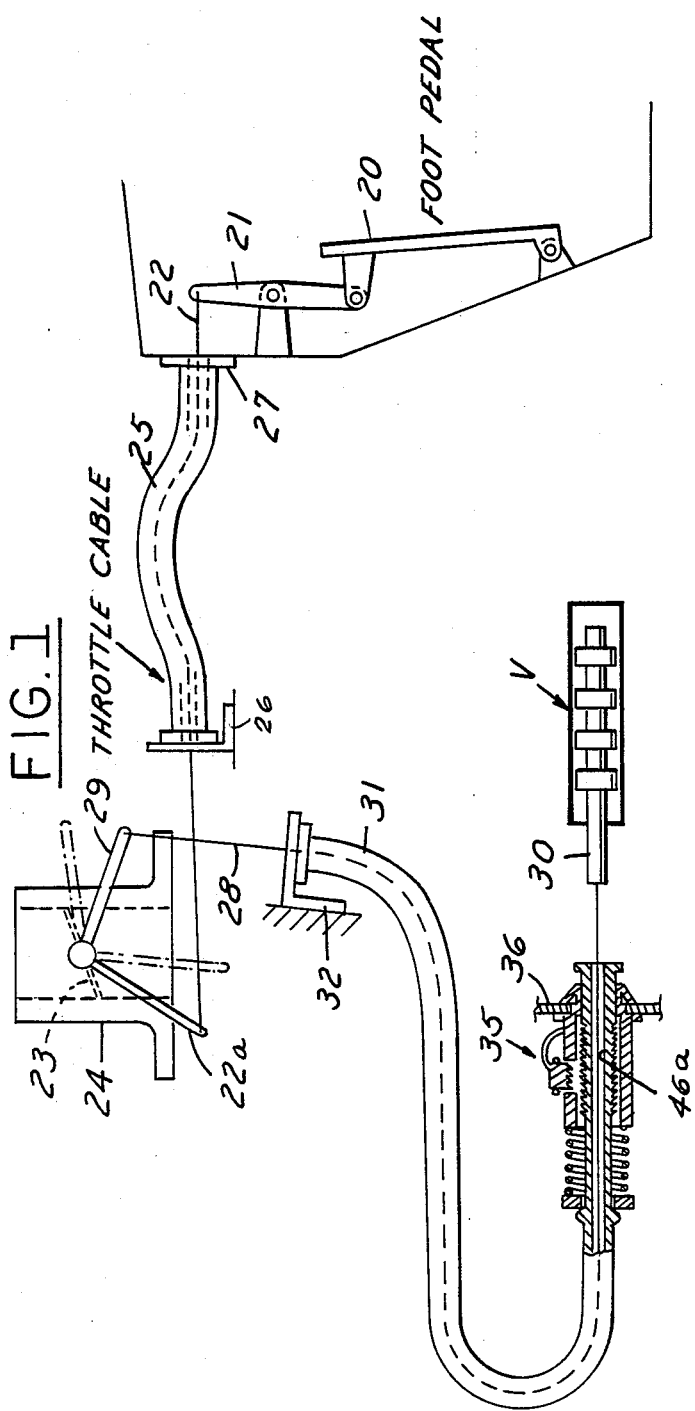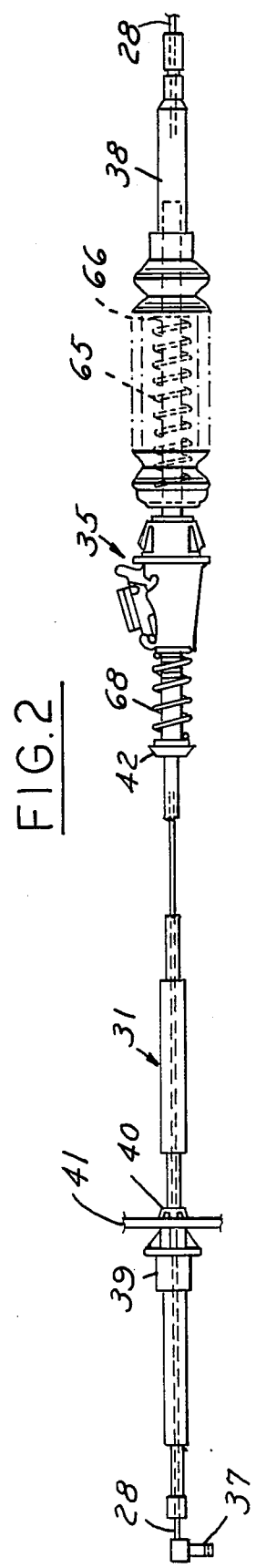

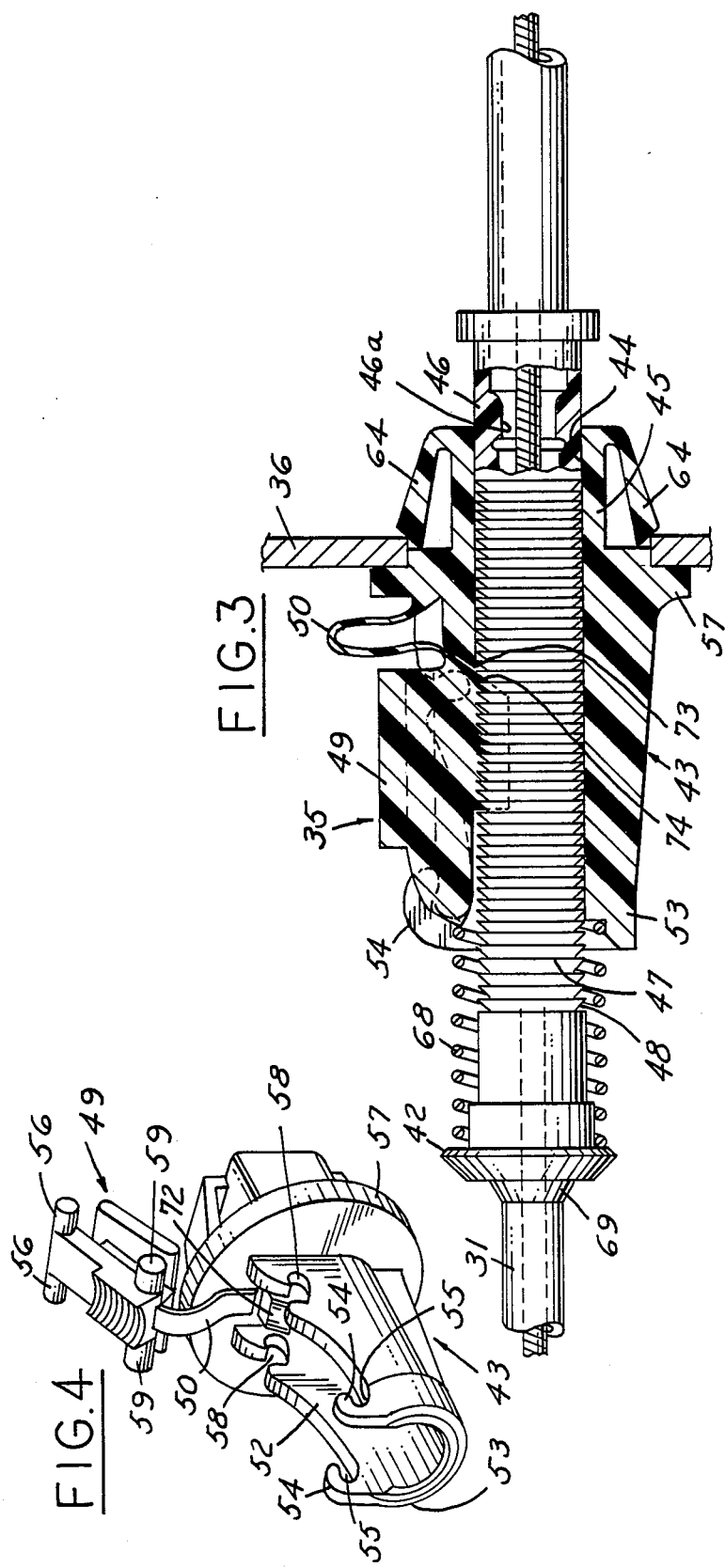

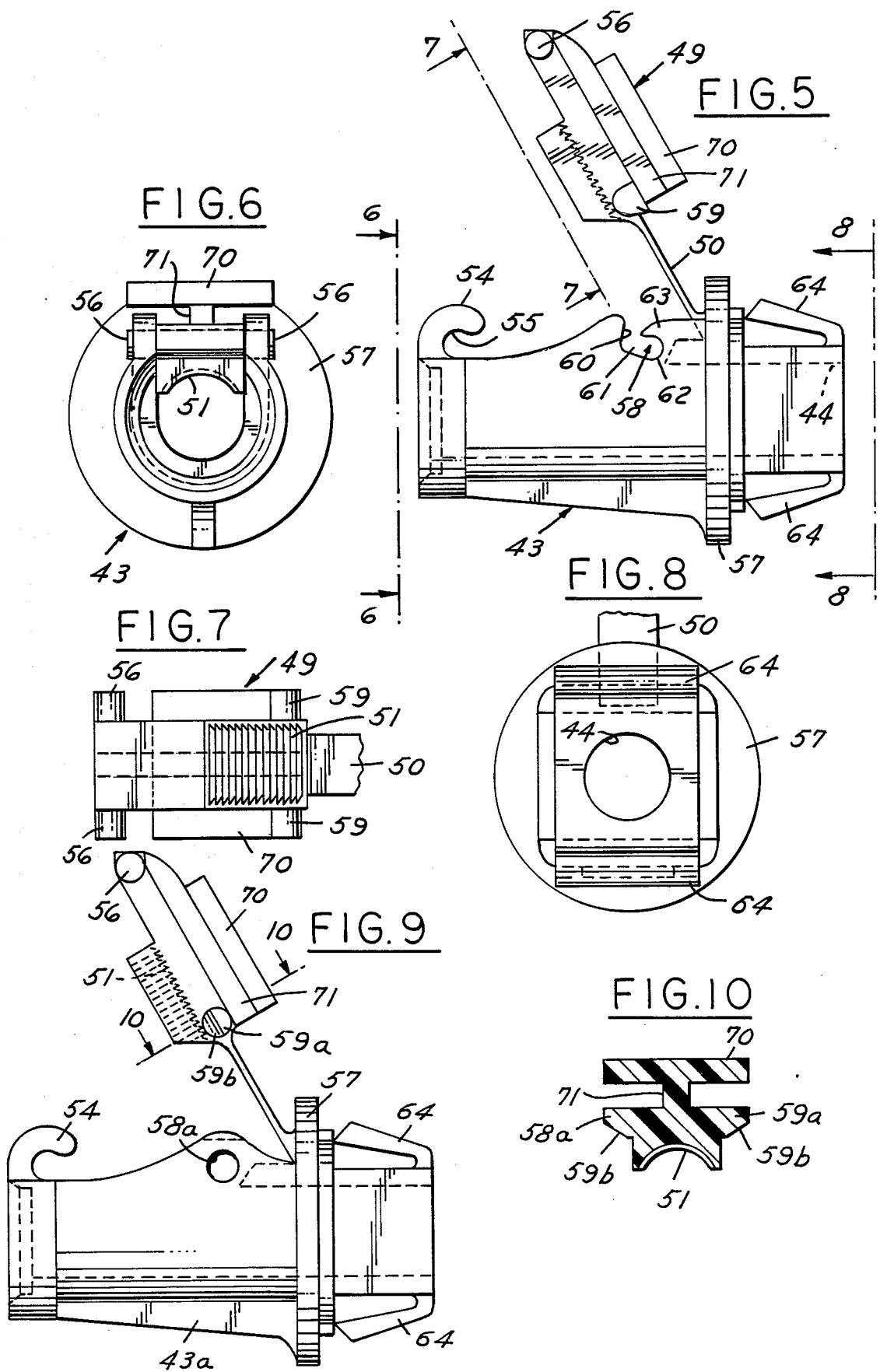

MANUALLY OPERATED AND LOCKED CONDUIT LENGTH ADJUSTER SYSTEM

This invention relates to cable control systems and particularly to a manually locked conduit length adjuster.

BACKGROUND AND SUMMARY OF THE INVENTION

In cable control systems comprising conduit and a cable extending therethrough, it is necessary to be able to adjust the length of either the conduit or the cable in the initial installation of the conduit and cable control.

Various manually operable systems have heretofore been suggested as shown, for example, in U.S. Pat. Nos. 2,172,294, 3,393,578, 3,572,159, 3,587,341, 3,662,617, 3,71,665, 4,331,041 and 4,177,691.

In one type of cable control system, a cable is connected at one end to an acutator and at the other end to a device to be actuated. A conduit surrounds at least a portion of the cable. In the installation of such a system, it is desirable to be able to control the length of the cable and, in turn, the position of the device to be actuated.

Among the objectives of the present invention are to provide an improved manually operated and locked conduit length adjuster system which can be attached to a bracket or other retaining device that is fixed and will permit the cable to seek a preferred position against axial load after which a locking member be applied to lock the member and, in turn, the conduit in place.

Among the further objectives of the present invention is to provide such a mechanism which offers good support to the cable in all directions, which includes a minimum number of parts minimizes labor and material costs and material handling; which has a hinge connecting a member for retaining the locking member for tangle-free shipping and which holds the locking member away from the mechanism during adjustment without interfering with the adjustment; which has a convenient thumb tab on the locking member to aid in locking; which provides a locking force perpendicular to the adjustment axis for ease of locking; which allows one member to rotate relative to another member in either an open or a locked position; which includes a spring at one end for a pre-adjusted load; which has the ability to be unlocked and locked repeatedly without damage to any part; which has a positive snap action lock; which will not corrode or rust; which is compact so that it can be utilized in confined areas; wherein plastic shrinkage will be uniform throughout the adjusting mechanism for accurate fit of the locking mechanisms; which can be made in various sizes and load capacities; wherein the amount of adjustment is not limited; and wherein the mechanism is light in weight.

In accordance with the invention, a manually operated and locked conduit length adjuster system comprises a cable adapted to be connected at one end to an actuator and at the other end to a device to be actuated, a first length of conduit adapted to be attached at one end to a fixed point and at the other end to a manually locked conduit length adjuster. The manually locked conduit length adjuster includes a plastic body adapted to be attached to the first length of conduit and having an opening through which a plastic slider extends. The slider includes annular teeth and the plastic body includes a locking member integrally hinged to the plastic body and adapted to be moved into position to cause teeth thereon to engage the teeth on the slider. The locking member has other portions thereof which engage the body for locking the locking member in position.

DESCRIPTION OF THE DRAWINGS

FIG. 1 is a schematic of a control system embodying the invention.

FIG. 2 is an elevational view of a control system embodying the invention.

FIG. 3 is a longitudinal sectional view of a portion of the adjuster mechanism.

FIG. 4 is a perspective view of a portion of the adjuster mechanism.

FIG. 5 is a view similar to FIG. 3 showing a part of the adjuster mechanism in an unlocked position.

FIG. 6 is a end view taken along the line 6—6 in FIG. 5 showing the adjuster member in locked position.

FIG. 7 is a fragmentary view taken along the line 7—7 in FIG. 5.

FIG. 8 is an end view taken along the line 8—8 in FIG. 5.

FIG. 9 is a view similar to FIG. 5 of a modified form of a portion of the device.

FIG. 10 is a sectional view taken along the line 10—10 in FIG. 9.

DESCRIPTION

Referring to FIG. 1, the invention is shown as being applied to a cable control system for controlling the position of a transmission valve V, by way of example. Such a system may include a foot pedal 20 which actuates a lever 21 to move a first cable 22 connected at one end to the lever 21 and at the other end to a lever 22a movable with the throttle plate 23 of a throttle body 24. A first conduit 25 surrounds at least a portion of the cable and has its ends fixed as at 26, 27. A second cable 28 extends from another lever 29 and is connected to the spool 30 of the valve V.

In accordance with the invention, a second conduit 31 is attached at one end to a bracket 32 and surrounds the cable 28. A manually locked conduit length adjuster 35 is mounted on a fixed wall or bracket 36, as presented described, and functions to adjust the length of the conduit 31 and, in turn, adjust the effective length of the cable 28 in order that the spool 30 of the valve V can be placed in the desired initial position of its movement.

An actuator cable assembly is shown in FIG. 2 and comprises the cable 28 which is connected at one end by a connector 37 to the actuator, such as actuator 29, and at the other end to a connector 38 which, in turn, is connected to the valve V. The conduit 31 has a mounting bracket 39 which includes resilient fingers 40 for engaging the surface of a wall 41 as shown in broken lines to fix the one end of the conduit 31. As shown in FIG. 3, the other end of the conduit 31 has an enlarged portion 42.

Referring to FIGS. 2-8, the adjuster 35 embodying the invention comprises a plastic body 43 having an opening 44 therethrough. Body 43 has a portion 45 which is cylindrical. A plastic slider 46 has an opening 46a therethrough and extends through the opening 44 and engages the cylindrical portion 45 which guides the slider 46. The slider 46 is formed with a plurality of longitudinally spaced annular teeth 47 along at least a portion of its length. Each tooth 47 is unsymmetrical in cross section with each tooth having an inclined surface 48 extending axially and radially outwardly toward the device being actuated, in this case the valve V. A locking member 49 is integrally attached to the body 43 by a hinge strap 50 at one end of body 43. The body 43 and locking member 49 together with the integral hinge strap 50 are thus molded in the same mold and as a result any dimensional differences due to the molding temperatures and other parameters are minimized.

The locking member 49 is provided with longitudinally spaced arcuate teeth 51, complementary to the teeth 47, that are adapted to engage the teeth 47 on the slider 46. The locking member 49 moves through an open ended longitudinally extending opening 52 in the body 43 into engagement with the teeth 47. Opening 52 thus defines a U-shaped portion 53 of the body 43.

The upper edges of the portion 53 are formed with U-shaped hooks 54 at the end of said body 43 opposite the hinge 50. The hooks 54 face longitudinally toward the device being actuated and defined open ended openings 55. Cylindrical pins 56 on the free end of locking member 49 extend laterally and are adapted to engage openings 55 to serve as hinge points for the locking member 49. An integral transverse wall 57 is provided on the body at the other end of the U-shaped portion 53 and the strap 50 extends from a surface of the wall 57. The edges of portion 43 further include open ended openings 58 that are adapted to receive a second set of laterally extending pins 59 on the locking member 49 for locking the locking member 49 in position. Each opening 58 includes a first radial portion 60 adjacent the free edge and a second longitudinally and radially extending portion 61 that extends in the direction of the device being actuated. The opening 58 further includes a closed end 62 thereby defining a hook 63.

The body 43 further includes flexible wings 64 that extend generally axially away from the device being actuated and are adapted to snap past the edge of an opening in a bracket or wall 36 for mounting the mechanism in fixed relation on the wall, the wings 64 snapping past the opening and engaging flange 57 on the body 43.

Where the end of the cable 28 is connected by a connector 38, a coil spring 68 is provided between the body 43 and the washer 42 that engages an enlarged portion 69 on the conduit 31.

In practice, the assembly as shown in FIG. 2 is preassembled and then placed in position on the automobile or the like with connections being made to the connector 37 and the device to be actuated such as the valve V. The locking member 49 is out of lock position.

As shown in FIG. 5, the hinge 50 flexes holding the locking member 49 out of locking engagement with slider 46. The device which is to be adjusted is placed in the initial desired position by manipulation of the device, as by moving the spool 30. The locking member 49 is manually moved to bring the pins 56 in engagement with the hooks 54, the pins 56 snapping into the openings 55 since the open end is narrowed and the major portion of the radius of each opening 55 is greater than 180°. The locking member 49 is then further swung downwardly bringing the teeth 51 thereon in engagement with the teeth 47 on the slider 46 and at the same time engaging the pins 59 with the openings 58 that also have narrowed open ends with an arcuate extent greater than 180° providing a snap action. The locking member 49 includes a wide finger engaging tab 70 connected by a longitudinally extending narrow wall 71 with the body of the locking member 49 to provide a ready means for engaging the thumb with the locking member 49.

In addition, the flange 57 includes an axially extending projection 72 that includes a surface 73 adapted to be contacted by a complementary surface 74 on the locking member 49 such that the load on the locking member in the direction toward the device being controlled is absorbed by the abutment 72. The surfaces 73, 74 are inclined radially inwardly and longitudinally away from the device being actuated.

In the form shown in FIG. 9, the pins 59a are adapted to extend into cylindrical openings 58a in the body 43a. To facilitate this snap action, the ends of the pins are beveled as at 59b to facilitate the snapping of the pins 59a into the openings 58a. In all other respects, this form of mechanism is like that described in connection with FIGS. 1–7.

It can thus be seen that there has been provided a manually locked conduit length adjuster system which offers good support to the cable in all directions, which includes a minimum number of parts minimizing labor and material costs and material handling; which has a hinge connecting a member for retaining the locking member for tangle-free shipping and which holds the locking member away from the mechanism during adjustment without interfering with the adjustment; which has a convenient thumb tab on the locking member to aid in locking; which provides a locking force perpendicular to the adjustment axis for ease of locking; which allows one member to rotate relative to another member in either an open or a locked position; which includes a spring at one end for a pre-adjusted load; which has the ability to be unlocked and locked repeatedly without damage to any part; which has a positive snap action lock; which will not corrode or rust; which is compact so that it can be utilized in confined areas; wherein plastic shrinkage will be uniform throughout the adjusting mechanism for accurate fit of the locking mechanisms; which can be made in various sizes and load capacities; wherein the amount of adjustment is not limited; and wherein the mechanism is light in weight.

We claim:

1. A manually locked conduit length adjuster system comprising
   a plastic body having an opening therethrough,
   a plastic slider extending through the plastic body and having an opening therethrough,
   a conduit adapted to have one end fixed,
   a cable extending through said conduit and said slider,
   said slider having a plurality of annular longitudinally spaced teeth about a portion of the periphery thereof,
   a plastic locking member connected to said body by an integral flexible hinge,
   said locking member having a plurality of longitudinally spaced arcuate teeth adapted to engage the teeth on said slider,
   said locking member being movable manually through a side wall of the body into locking engagement with said slider, and
   interengaging means between the locking member and the body for holding the locking member in locked position.

2. The conduit length adjuster system set forth in claim 1 wherein said interengaging means comprises pivot means for pivoting the locking member with respect to said body and locking means for locking the locking member in locked position.

3. The conduit length adjuster system set forth in claim 2 wherein said pivot means comprises integral hooks on said body defining openings facing longitudinally and laterally extending pins on said locking member adapted to engage said openings for pivoting the locking member relative to the body.

4. The conduit length adjuster system set forth in claim 3 wherein said locking means comprises radially extending open ended openings in said body and laterally extending pins on said locking member adapted to extend into said openings for frictionally locking said locking member in locked position.

5. The conduit length adjuster system set forth in claim 4 wherein said open ended openings include a portion inclined to the axis of said slider.

6. The conduit length adjuster system set forth in claim 5 including abutment means on said body engaged by said locking member.

7. The conduit length adjuster system set forth in claim 3 wherein said locking means comprises transverse openings in said body and laterally extending pins on said locking member adapted to engage said openings.

8. The conduit length adjuster system set forth in claim 7 wherein said laterally extending pins of said locking member have beveled end portions for facilitating the snapping of the pins into engagement with the openings.

9. The conduit length adjuster system set forth in claim 8 including abutment means on said body engaged by said locking means.

10. The conduit length adjuster system set forth in claim 1 including a finger engaging pad extending laterally beyond the confines of the locking member for facilitating application of force thereto.

11. A manually locked conduit length adjuster system comprising
   a plastic body having an opening therethrough, a portion of said opening defining a first cylindrical surface, another portion of said opening defining a second cylindrical surface and having a transverse opening therein,
   a conduit adapted to have one end fixed,
   a plastic slider having an opening therethrough and including a cylindrical portion extending through the opening of the plastic body and engaging said cylindrical surface of the opening in the body for guiding the slider for longitudinal movement relative to said body,
   a cable extending through said conduit and said slider,
   said slider having a plurality of annular longitudinally spaced teeth about a portion of the periphery thereof,
   a plastic locking member connected to said body by an integral flexible hinge,
   said locking member having a plurality of longitudinally spaced arcuate teeth adapted to engage the teeth on said slider,
   said locking member being movable manually through the transverse opening of the body into locking engagement with said slider, and
   interengaging means between the locking member and the body for holding the locking member in locked position.

12. The conduit length adjuster system set forth in claim 11 wherein said interengaging means comprises pivot means for pivoting the locking member with respect to said body and locking means for locking the locking member in locked position.

13. The conduit length adjuster system set forth in claim 12 wherein said pivot means comprises integral hooks on said body defining openings facing longitudinally and laterally extending pins on said locking member adapted to engage said openings for pivoting the locking member relative to the body.

14. The conduit length adjuster system set forth in claim 13 wherein said locking means comprises radially extending open ended openings in said body and laterally extending pins on said locking member adapted to extend into said openings for frictionally locking said locking member in locked position.

15. The conduit length adjuster system set forth in claim 14 wherein said open ended openings include a portion inclined to the axis of said slider.

16. The conduit length adjuster system set forth in claim 15 including abutment means on said body engaged by said locking member.

17. The conduit length adjuster system set forth in claim 13 wherein said locking means comprises transverse openings in said body and laterally extending pins on said locking member adapted to engage said openings.

18. The conduit length adjuster system set forth in claim 17 wherein said laterally extending pins of said locking member have beveled end portions for facilitating the snapping of the pins into engagement with the openings.

19. The conduit length adjuster system set forth in claim 18 including abutment means on said body engaged by said locking means.

20. The conduit length adjuster system set forth in claim 11 including a finger engaging pad extending laterally beyond the confines of the locking member for facilitating application of force thereto.

21. A manually locked conduit length adjuster mechanism comprising
   a plastic body having an opening therethrough and adapted to be connected to a conduit,
   a plastic slider having an opening therethrough and extending through the opening of the plastic body to said body,
   said slider having a plurality of annular longitudinally spaced teeth about a portion of the periphery thereof,
   a plastic locking member connected to said body by an integral flexible hinge,
   said locking member having a plurality of longitudinally spaced arcuate teeth adapted to engage the teeth on said slider,
   said locking member being movable manually through a side wall of the body into locking engagement with said slider, and
   interengaging means between the locking member and the body for holding the locking member in locked position.

22. The conduit length adjuster system set forth in claim 21 wherein said interengaging means comprises pivot means for pivoting the locking member with respect to said body and locking means for locking the locking member in locked position.

23. The conduit length adjuster mechanism set forth in claim 22 wherein said pivot means comprises integral hooks on said body defining openings facing longitudinally and laterally extending pins on said locking member adapted to engage said openings for pivoting the locking member relative to the body.

24. The conduit length adjuster mechanism set forth in claim 23 wherein said locking means comprises radially extending open ended openings in said body and laterally extending pins on said locking member adapted to extend into said openings for frictionally locking said locking member in locked position.

25. The conduit length adjuster mechanism set forth in claim 24 wherein said open ended openings include a portion inclined to the axis of said slider.

26. The conduit length adjuster mechanism set forth in claim 25 including abutment means on said body engaged by said locking member.

27. The conduit length adjuster mechanism set forth in claim 23 wherein said locking means comprises transverse openings in said body and laterally extending pins on said locking member adapted to engage said openings.

28. The conduit length adjuster mechanism set forth in claim 27 wherein said laterally extending pins of said locking member have beveled end portions for facilitating the snapping of the pins into engagement with the openings.

29. The conduit length adjuster mechanism set forth in claim 28 including abutment means on said body engaged by said locking means.

30. The conduit length adjuster mechanism set forth in claim 21 including a finger engaging pad extending laterally beyond the confines of the locking member for facilitating application of force thereto.

31. A manually locked conduit length adjuster mechanism comprising
  a plastic body having an opening therethrough, a portion of said opening defining a first cylindrical surface, another portion of said opening defining a second cylindrical surface and having a transverse opening therein,
  a plastic slider including a cylindrical portion extending through the opening of the plastic body and engaging said cylindrical surfaces of the opening in the body for guiding the slider for longitudinal movement relative to said body,
  said slider having a plurality of annular longitudinally spaced teeth about a portion of the periphery thereof,
  a plastic locking member connected to said body by an integral flexible hinge,
  said locking member having a plurality of longitudinally spaced arcuate teeth adapted to engage the teeth on said slider,
  said locking member being movable manually through the transverse opening of the body into locking engagement with said slider, and
  interengaging means between the locking member and the body for holding the locking member in locked position.

32. The conduit length adjuster mechanism set forth in claim 31 wherein said interengaging means comprises pivot means for pivoting the locking member with respect to said body and locking means for locking the locking member in locked position.

33. The conduit length adjuster mechanism set forth in claim 32 wherein said pivot means comprises integral hooks on said body defining openings facing longitudinally and laterally extending pins on said locking member adapted to engage said openings for pivoting the locking member relative to the body.

34. The conduit length adjuster mechanism set forth in claim 33 wherein said locking means comprises radially extending open ended openings in said body and laterally extending pins on said locking member adapted to extend into said openings for frictionally locking said locking member in locked position.

35. The conduit length adjuster mechanism set forth in claim 34 wherein said open ended openings include a portion inclined to the axis of said slider.

36. The conduit length adjuster mechanism set forth in claim 35 including abutment means on said body engaged by said locking member.

37. The conduit length adjuster mechanism set forth in claim 32 wherein said locking means comprises transverse openings in said body and laterally extending pins on said locking members adapted to engage said openings.

38. The conduit length adjuster mechanism set forth in claim 37 wherein said laterally extending pins of said locking member have beveled end portions for facilitating the snapping of the pins into engagement with the openings.

39. The conduit length adjuster mechanism set forth in claim 31 including abutment means on said body engaged by said locking means.

40. The conduit length adjuster mechanism set forth in claim 31 including a finger engaging pad extending laterally beyond the confines of the locking member for facilitating application of force thereto.

* * * * *